Dec. 2, 1958 F. A. HEMPHILL 2,863,138
TWO-WAY SHIFT REGISTER
Filed March 5, 1957 2 Sheets-Sheet 1

INVENTOR.
FRANCIS A. HEMPHILL
BY George Baum
ATTORNEY

INVENTOR.
FRANCIS A. HEMPHILL
BY George Baron
ATTORNEY 2,863,138

TWO-WAY SHIFT REGISTER

Francis A. Hemphill, Honeybrook, Pa., assignor to Burroughs Corporation, Detroit, Mich., a corporation of Michigan Application March 5, 1957, Serial No. 644,083

8 Claims. (Cl. 340—174)

Figure 1A:
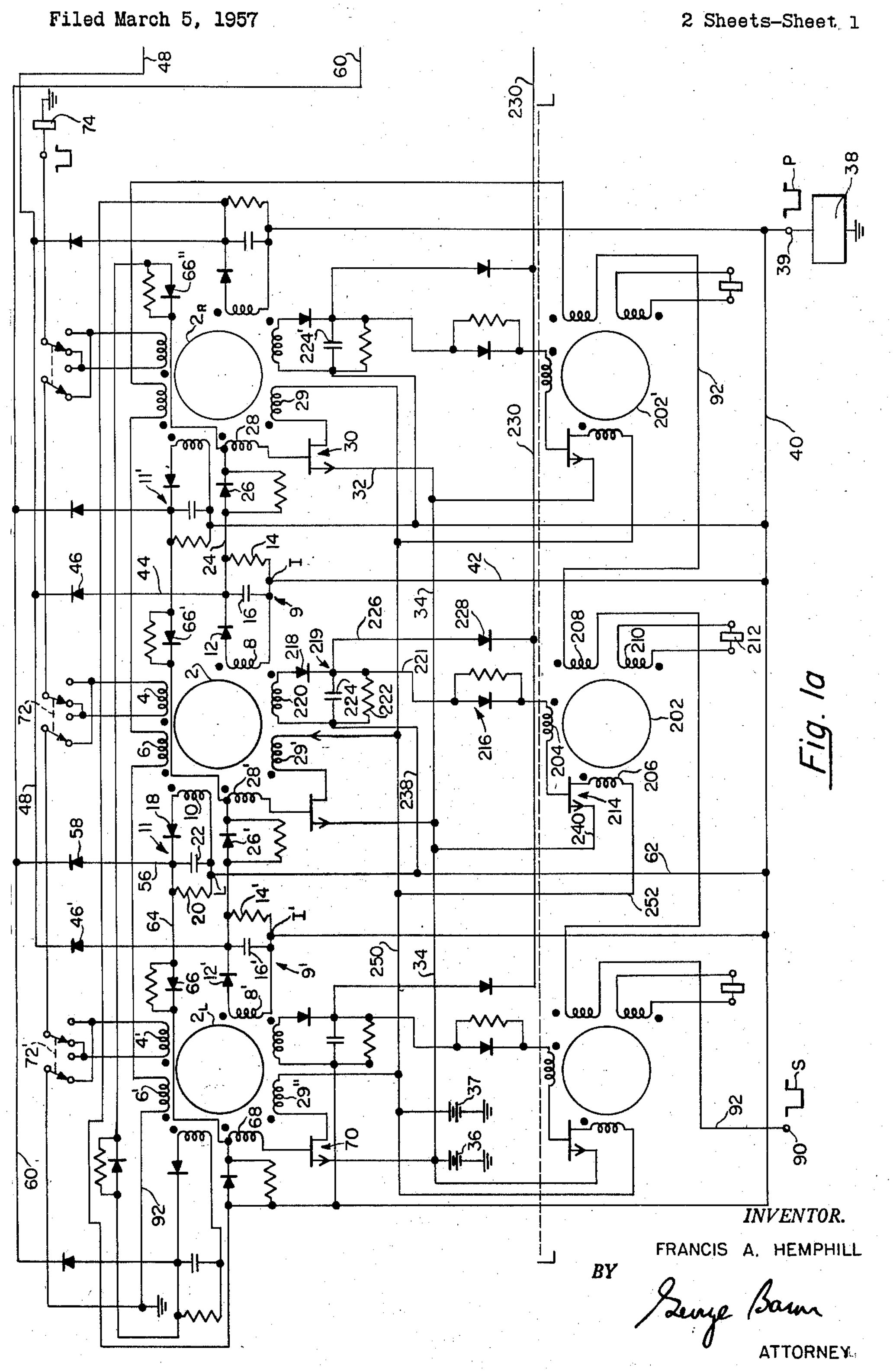

This invention relates to binary computers, and more particularly to shift registers used in such binary computers.

Shift registers consist of a plurality of bistable storage devices so interconnected that stored information may be advanced from one storage device to another by the application of an advancing signal pulse applied to a winding coupled to each device. Digital information is stored in a shift register in binary form wherein one state of a bistable device represents the storage of a "1" and its other state represents the storage of a "0." Binary information may be read into a shift register either serially or in parallel. Thus the number 8, represented as 1000 in binary form, may be serially inserted into the register by reading a "0" (the least significant digit of the binary number 8) into the first bistable storage device in the register. Then by a series of alternating advancing pulses and read-in pulses, the least significant "0" is shifted to its adjacent storage device and the next significant "0" is read into the storage device that previously stored the least significant "0." The two "0's" are advanced and the read-in of the third "0" takes place. The "1" of the number 1000 is read into the shift register last after the three "0's" of such number have been advanced. When the binary number 1000 is read into a shift register in parallel, all the digits "1," "0," "0," "0" forming such binary number are read into the register simultaneously so that there is no time lost in waiting for digits to be advanced prior to the entry of other digits as is done in serial entry.

When a shift register shifts out information from a first bistable device to a second bistable device, it is necessary that the latter be cleared of its information by an advancing signal pulse before it be ready to receive the information being read out of the former. Consequently certain registers require another bistable device to store or delay the information being read-out of the first bistable device until the second bistable device has had its information read-out. Thus two advancing pulses are needed to transfer a single bit of information from one bistable device to an adjacent bistable device, one advancing pulse being needed to read-out information stored in a storage device to a delay device, and a second advancing signal pulse to transfer the information in the delay device to the next adjacent storage device. Such a shift register is called a two storage device per bit shift register because two storage devices are needed for every bit of information that is to be advanced along the shift register.

There are shift registers which are able to advance information fron one bistable device to another during one advance pulse, such registers relying upon a capacitor to store the information being read out of a first bistable device as an electric charge during the application of an advancing pulse to the storage devices, such electric charge being maintained on the capacitor during the presence of the advancing pulse; but when said advancing pulse terminates, the capacitor discharges as a current in the read-in circuit of the next adjacent bistable device and actuates the latter into the same state as existed in said first bistable device just prior to the application of an advancing pulse. Such a shift register is termed a single storage device per bit shift register because it requires only a single storage device for storing and transferring information during one advancing pulse interval.

It is a desirable feature, in the operation of shift registers, to be able to shift stored information either to the right or to the left. There are shift registers now available that perform such reversible transfer of information, but they normally are too slow or rely upon too many components to carry out such reversible transfer.

The present invention utilizes as its storage element a bistable core having a substantially square hysteresis loop characteristic. Such core material is set in its "1" state when its residual flux is in a positive remanent state and it is set in its "0" state when its residual flux is in a negative remanent state. Adjacent cores are coupled to each other by means of a forward transfer loop and a backward transfer loop. A capacitor is in each loop for the purpose of storing, as a potential, information being read out of a core. When a core is switched from its "1" state to its "0" state by the action of an advancing pulse, a charge is built up on both capacitors. However, by actuating a gate, a low impedance path is provided for one of the capacitors but not for the other. If the low impedance path is provided for the capacitor that lies in the backward transfer loop, such capacitor discharges through such low impedance path and has no effect in switching a core. On the other hand, the capacitor in the forward transfer loop is made to discharge through the read-in circuit of said forward transfer loop, such discharge triggering an amplifier circuit so as to supply switching energy to a core that is forward of the core being read-out. By reversing the impedance paths of the capacitors, namely, permitting the capacitor in the forward transfer loop to discharge through a low impedance path, the capacitor in the backward transfer loop is made to discharge through an amplifying circuit so as to switch a core that is to the left of the core being read-out. By applying an inhibit pulse, for the duration of an advancing pulse, to that capacitor which lies in the transfer loop which will be active in transferring the information from one core to an adjacent core, information that has been read-out of a core can be preserved as a charge on said capacitor. Upon termination of the advancing pulse which has served its function of reading out the information stored in the cores, the inhibiting pulse is removed and the charge on the capacitor is permitted to leak off and trigger an amplifying read-in circuit of an adjacent core. The use of an inhibit pulse on a capacitor in a transfer loop during the application of an advancing pulse permits the read-out of a core and advancement of such read-out information to an adjacent core during one advancing pulse interval. The inhibit pulse in conjunction with the storage capacitor permits one core per bit operation of a shift register.

It is an object of this invention to provide improved reversible switching means.

It is a further object to provide a novel reversible shift register employing bistable magnetic elements.

It is yet another object to obtain a reversible shift register employing bistable magnetic cores yet not increase substantially the number of windings on said cores in order to attain reversible shifting of binary information in such cores.

Figure 1B:
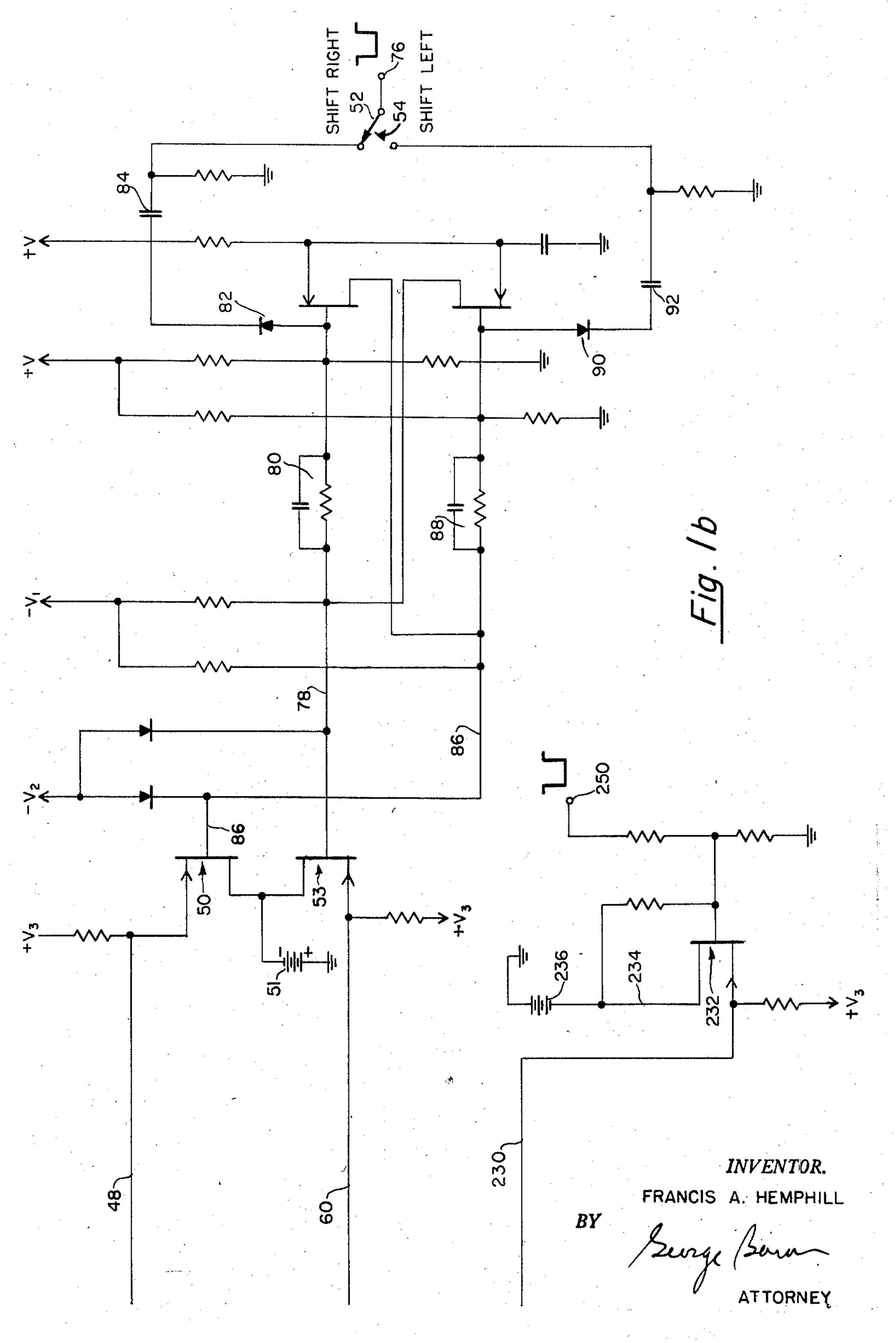

The foregoing objects, advantages, construction and operation of the present invention will become more readily apparent from the following description and accompanying drawings, in which:

Fig. 1*a* is an electrical schematic diagram of an embodiment of a reversible shift register forming the present invention; and Fig. 1*b* is an electrical schematic of auxiliary switching circuitry used in conjunction with the shift register of Fig. 1*a*.

Turning to Fig. 1*a* there is shown a one core per bit shift register wherein only three stages are shown, it being understood that many more stages can be used in accordance with the desired capacity of the shift register. Only one stage and its associated elements will be described since all the other stages shown are substantially repetitions of the first stage. Element 2 of the second stage is a bistable magnetic core having substantially square hysteresis loop characteristics. Such a core is a storage cell or element that retains information in binary form and it may be switched into one of two stable magnetic remanent states by conventional means, wherein each stable state represents the storage of either a binary "1" or a binary "0." Wound on core 2 are setting winding 4, advancing or interrogating winding 6, output winding 8. Output winding 8 lies in transfer loop 9 that will transfer, when operating, information being read out of core 2 to an adjacent core $2_R$ to the right of core 2. Also wound on core 2 is output winding 10 lying in transfer loop 11 that will transfer, when operating, information being read out of core 2 to an adjacent core $2_L$ to the left of core 2.

The shift-right transfer loop 9 comprises in part output winding 8, diode 12, resistor 14 and a capacitor 16 in parallel with output winding 8 and resistor 14. The shift-left transfer loop 11 comprises in part output winding 10, diode 18, resistor 20 and a capacitor 22 in parallel with output winding 10 and resistor 20. Capacitor 16, like capacitor 22, has two discharge paths and which discharge path is taken by capacitor 16 will determine whether or not the core $2_R$ to the right of core 2 is affected by the switching of core 2 from its "1" state to its "0" state. One discharge path of capacitor 16 is through lead 24, diode 26, trigger winding 28, N–P–N type transistor 30, emitter electrode lead 32, conductor 34, D.-C. bias source 36 for N–P–N type transistor 30, through ground, through low impedance source 38 of inhibit pulses, and back to capacitor 16 through conductors 40 and 42. A second path for capacitor 16 is through lead 44, diode 46, conductor 48, a low impedance path through transistor 50, D.-C. bias source 51, through ground, through low impedance source 38 and back to capacitor 16 through conductors 40 and 42.

The capacitor 22 in shift-left transfer loop 11 also has two discharge paths, its low impedance path being established through lead 56, diode 58, conductor 60, then through a low impedance path through transistor 53, through D.-C. bias source 51, through ground, then back to capacitor 22 through conductors 40 and 62. The second discharge path of capacitor 22 is through conductor 64, diode 66, trigger winding 68, transistor 70, D.-C. bias source 36, ground, through low impedance source 38 of inhibit pulses, and back to capacitor 22 via conductors 40 and 62. Diodes 66, 66′, etc. are isolating diodes for preventing the discharge of a shift-right capacitor from taking the low impedance path of a shift-left capacitor, and vice versa. The function of such isolating diodes 66, 66′, etc. will be brought out more clearly when the description of the operation of the one core per bit shift register is given hereinafter.

Switches 72, 72′, etc. connect a source of input pulses 74 with input windings 4, 4′, etc. so that input pulses emanating from source 74 may set cores 2, $2_L$, $2_R$, etc. to their respective "1" or "0" states depending upon the position of switch 72, 72′, etc. It is to be understood that switches 72, 72′, etc. are indicated symbolically and that they could be in fact voltage signals coming from output terminals of a logic circuit, another shift register, or other pulse-producing components not shown.

Transistors 50 and 53 are P–N–P type transistors that are biased to cut-off by applying a negative potential from D.-C. bias source 51 to their collector electrodes. In order to render such transistors 50 and 53 conductive, negative pulses are applied to the base of each transistor 50 and 53. Consequently negative trigger pulses are applied at input terminal 76, such negative polarity being applied to the base of transistor 53 when switch arm 52 is in the shift-right position through the circuit comprising the base of transistor 53, conductor 78, resistor-capacitor network 80, diode 82, capacitor 84, switch arm 52, and input terminal 76. When the switch arm 52 is in the switch-left position, a negative trigger pulse appearing at input terminal 76 is applied to the base of transistor 50 through lead 86, resistor-capacitor network 88, diode 90, capacitor 92, switch arm 52 and input terminal 76. The position of switch arm 52 determines which transistor 50 or 53 will be triggered into conduction when a negative pulse is applied at input terminal 76, and which transistor is conducting determines which diode 58 or 46 is looking into a low impedance path.

Since the instant invention of a reversible shift register is applied to a one core per bit shift register, it is required that the information being read out of a core be prevented from being read into an adjacent core until such adjacent core has been cleared of its information. Consequently when a core such as core 2 is sensed by a current pulse passing through its associated sensing winding 6, binary information being read out of core 2 appears as a charge on capacitor 16 and capacitor 22. This charge on the capacitors must not be permitted to leak off and flow into a trigger winding such as winding 28 to start transistor 30 conducting until core $2_R$ has been read out. To avoid such premature discharge, an inhibiting pulse P from inhibit source 38 is applied at point I through conductors 40 and 42 so that the dotted terminal of trigger winding 28 remains negative during the read-out of core 2 and while capacitor 16 is being charged, thus maintaining transistor 30 cut off. Since the inhibit pulse terminates when the sensing current terminates, capacitor 16 is permitted to discharge through trigger winding 28, triggering transistor 30 into conduction so that switching winding 29 connected to the collector of N–P–N transistor 30 carries current therethrough to apply switching energy to core $2_R$.

Sensing pulses S for sensing and advancing the information in a core appear at input terminal 90 as negative pulses so that advancing or sensing current is caused to flow from ground, through conductor 92, through all the sensing windings 6′, 6, etc. wound on the cores and back to terminal 90. The cores above line L—L and their accompanying circuitry relate to the reversible shift register aspect of the present invention. The cores below line L—L and their associated circuitry relate to a parallel storage unit for storing information that is being shifted in the register above the line L—L and for reinstating such stored information back into the shift register. The operation of that aspect of the invention above line L—L will now be described, the description of the parallel storage circuitry being deferred until later.

Assume that switches 72′, 72, etc. have been set in such a position that a setting pulse from input source 74 causes current flow through setting windings 4, 4′, etc. to switch the cores 2, $2_L$, etc. associated with such setting windings towards their positive magnetic remanent states or negative remanent states, depending upon the selected position of such switches. If the switches 72, 72′ were left in the position shown in the drawing, all three cores would be set into their positive remanent or "1" states. To shift the "1's" stored in said cores to the right, the switch arm 52 is moved to its switch right position and three negative pulses are applied substantially simultaneously at terminal 76, terminal 39, and terminal 90. The negative pulses appearing at terminal 90 provide sensing or advancing current to flow from ground through sensing windings 6′, 6, etc. entering the latter through their dotted terminals so as to drive their associated cores $2_L$, 2, $2_R$, etc. toward their "0" states. Taking core 2 as an example, when it is being switched toward its "0" state, voltages are induced in windings 8, 10 and 28' such that the dotted terminals of such windings become positive. The positive potential appearing at the dotted terminal of output winding 8 will cause transfer current to flow through diode 12 to charge capacitor 16 since diode 46 is in series with cut-off transistor 50. Such transfer current is prevented from appearing at the dotted terminal of trigger winding 28 because of the presence of an inhibiting pulse at terminal 39. The positive potential appearing at the dotted terminal of output winding 10 produces transfer current that leaks off through conductor 56, diode 58, conductor 60, through transistor 53, D. C. bias source 51, through ground, and back to the capacitor 22 via conductors 40 and 62, preventing the storage of charge on capacitor 22. Now, when the advancing pulse applied at terminal 90, inhibiting pulse applied at terminal 39, and shift pulse applied at terminal 76 terminate, capacitor 16 discharges from its positive plate through lead 24, diode 26, trigger winding 28, transistor 30, lead 32, D. C. bias source 36, through ground back to its negative plate via conductors 40 and 42. Once transistor 30 begins to conduct, collector current follows the emitter current of transistor 30 and such collector current enters switching winding 29 at its undotted terminal to switch core $2_R$ toward its "1" state. It is noted that trigger winding 28 and switching winding 29 are regeneratively coupled so that once switching winding 29 begins switching core $2_R$ towards its "1" state, a voltage is induced in trigger winding 28 so as to maintain transistor 30 conducting until the complete switching of core $2_R$ to its positive magnetic saturation state no longer supports regeneration and transistor 30 is brought to its cut-off condition by D. C. bias source 36. The "1" that was in core 2 has been read out of core 2 and has been transferred to core $2_R$, but not before core $2_R$ was cleared of its information. D. C. bias 37 is +6 volts and D. C. bias 36 is +1.5, so transistor 30 current will flow, when such transistor 30 is conducting, from the positive terminal of D. C. bias 37 through conductor 250, switching winding 29, transistor 30, emitter electrode lead 32, conductor 34, D. C. bias 36, and back through ground to the negative terminal of D. C. bias source 37.

When it is desired to switch information in the register toward the left, switch arm 52 is moved to the shift left terminal. Now, when advancing pulses, inhibition pulses, and triggering pulses are applied simultaneously, capacitor 16 finds a low impedance path through diode 46, conductor 48, transistor 50 that was triggered into conduction by a trigger pulse being applied at input terminal 76, through D.-C. source 51 and ground, back through low impedance source 38 and conductors 40 and 42 to capacitor 16. Capacitor 22 will be looking into a high impedance path through diode 58 because transistor 53 is non-conducting and acting as an open switch. The inhibit pulse being applied at point L prevents discharge of capacitor 22 through a path including diode 66 and trigger winding 68. As soon as such inhibit pulse terminates, capacitor 22 discharges through diode 66, trigger winding 68, transistor 70, D.-C. bias 36, ground, through inhibit pulse source 38, terminal 39, and back to capacitor 22 through conductors 40 and 62. As soon as transistor 70 becomes conductive, the collector electrode current follows emitter current through the switching winding 29'', entering the latter through its undotted terminal so as to switch core $2_L$ towards its "1" state. It is seen that trigger winding 68 and switching winding 29'' are regeneratively coupled so that N-P-N transistor 70 is maintained in its conducting state until core $2_L$ has completely switched to its positive saturation state.

Diodes 26', 66, 66', etc. isolate a shift-right capacitor from a shift-left capacitor so that the discharge of the former does not oppose or become confused with the discharge of the latter, and vice versa. For example, if the register is operating in its shift-right condition, the discharge of a capacitor, such as capacitor 16', would by-pass trigger winding 28' and oppose the discharge of the capacitor in transfer loop 11' through its low impedance path that includes transistor 53. Similarly when the register is in its shift-left condition, the discharge of a capacitor, such as the capacitor in transfer loop 11', would by-pass trigger winding 28' and oppose the discharge of capacitor 16' in transfer loop 9' through the low impedance path for capacitor 16' that includes transistor 50. Isolating diodes, similar to diode 26', prevent such comingling of the discharge paths of capacitors in adjacent transfer loops.

Although the reversible shift register has been illustrated as a one core per bit shift register, the basic technique for achieving reversibility can be applied to a two core per bit shift register. In a two core per bit shift register, the inhibit pulse is not necessary. However, in order to transfer information from a first core to an adjacent core, the first core is sensed at time $t_1$ and its information is transferred to an "idle" or temporary storage core. At time $t_2$, the information in the "idle" core is sensed and its information is then transferred to the adjacent core. Fig. 1 of the Booth Patent No. 2,680,819, issued on June 8, 1954, discloses a conventional two core per bit shift register to which the present invention can be applied if one were to use a two core per bit shift register instead of a one core per bit shift register.

Turning now to Figure 1*a*, the cores and accompanying circuitry below line L—L relate to a parallel read-out and storage system that would constitute one of many auxiliary systems that could be coupled to the two way shift register described herein. Looking at the second stage of the circuitry below line L—L, there is shown a bistable core 202 having four windings wound thereon comprising a trigger winding 204, a switching winding 206, a sensing or advancing winding 208 and an output winding 210. Voltages induced in output winding 210 as a consequence of the switching of core 202 from one magnetic remanent state to another are transmitted to a utilization circuit 212. One terminal of trigger winding 204 is connected to the base of transistor 214 and its other terminal is joined to diode-resistance path 216 which in turn is joined to transfer loop 219 by conductor 221. Transfer loop 219, like the other transfer loops of the shift register, comprises a diode 218, output winding 220 on core 2, and resistor 222. Shunting output winding 220 is capacitor 224, which capacitor has a discharge path that includes conductor 226, diode 228, conductor 230, transistor 232, conductor 234, D. C. bias source 236, ground, low impedance pulse source 38, input terminal 39, conductors 40 and 62, and back to capacitor 224 via conductor 238.

Another discharge path for capacitor 224 includes conductor 221, diode-resistance path 216, trigger winding 204, transistor 214, emitter electrode lead 240, conductor 34, D. C. bias source 36, ground, through low impedance source 38, input terminal 39, conductors 40, 62 and 238, back to capacitor 224. Cut-off bias is applied to all the N-P-N transistors in the switching circuits for the cores from D. C. bias source 36. Such cut-off bias is applied to the emitter electrode of transistor 214, but this bias is overcome when the base of transistor 214 is driven sufficiently positive by reason of the discharge of capacitor 224 through winding 204.

Input terminal 250 (Fig. 1*b*) receives negative pulses for the purpose of making the base of P-N-P type transistor 232 sufficiently negative so as to remove the effect of the cut-off bias being applied to the collector electrode of such transistor 232 by D. C. source 236.

The operation of the parallel read-out and storage system utilized in conjunction with the reversible shift register shown herein will now be described. Negative input pulses are applied at input terminal 250 substantially coincidentally with the negative pulses being applied at input terminals 39, 76, and 90. Transistor 232 is a P–N–P type transistor that is biased to cut-off by applying a negative bias to its collector electrode from D. C. bias source 236. Consequently as long as negative pulses appear at input terminal 250, transistor 232 is a low impedance path for capacitor 224, such low impedance path consisting of the positive terminal of capacitor 224, conductor 226, diode 228, conductor 230, transistor 232, conductor 234, D. C. bias source 236, ground, low impedance source 38 of inhibit pulses, input terminal 39, conductors 40 and 62, and the negative plate of capacitor 224 through conductor 238. As information is being shifted left or right in the shift register above line L—L, there is no transfer to storage elements below line L—L because negative pulses appear at input terminal 250 at the same time that advancing pulses are being applied at input terminal 90, creating low impedance paths for all the capacitors, such as capacitors 224, 224′, etc., that lie in the shift-down transfer loop. When it is desired to read-out in parallel the information existing in the shift register above line L—L, a negative pulse is not applied to input terminal 250 when an advancing pulse is being applied to the sensing windings 6′, 6, etc. wound on cores $2_L$, 2, etc. Transistor 232 is now cut-off because of the influence of D. C. bias source 236. Once transistor 232 is rendered non-conducting, capacitor 224 has a discharge path that comprises the positive plate of capacitor 224, conductor 221, diode-resistance path 216, trigger winding 204, emitter electrode of transistor 214, conductor 34, D. C. bias source 36, ground, low impedance source 38, input terminal 39, conductors 40, 62 and 238, back to the negative plate of capacitor 224. Once transistor 214 is rendered conductive by the discharge of capacitor 224 through trigger winding 204, the collector current follows the emitter current of transistor 214 and switching energy is applied to core 202 as current flows from D. C. bias source 37, conductors 250 and 252, switching winding 206, through transistor 214, conductors 240 and 34, D. C. bias source 36, through ground and back to D. C. bias source 37. As was explained hereinabove, D. C. bias source 37 was chosen as 6 volts and D. C. bias source 36 as 1.5 volts so that the emitter electrodes of all the transistors in the shift-down portion of the shift register are maintained at −4.5 volts.

As magnetomotive force is being applied to core 202 through switching winding 206, windings 204 and 206 are regeneratively coupled, so that the continued switching of core 202 by current flow through the switching winding 206 induces a positive potential at the undotted terminal of trigger winding 204. Such positive potential is applied to the base of N–P–N transistor 214, maintaining the latter in its conducting state until core 202 is saturated. Whereupon regenerative coupling between windings 204 and 206 ceases, and upon cessation of the advancing pulse, the core 202 relaxes to its remanent state corresponding to the saturation state to which it was switched by switching winding 206. Thus, the information in the cores above line L—L is shifted down in parallel to corresponding cores below line L—L by transfer loops that are similar to those transfer loops that are used in the reversible shift register above line L—L.

One may control the time at which information is shifted down by applying a coded series of pulses at input terminal 250. For example, a series of negative pulses may be applied to input terminal 250 simultaneously with the advancing negative pulses being applied at input terminal 90, but every second, third, fourth, or $n^{th}$ pulse may be absent from the series being applied at input terminal 250. When such $n^{th}$ pulse is absent, transistor 232 does not conduct and parallel shift down takes place. The information now stored in the cores below line L—L may be operated upon by transfer loops similar to those coupling the cores above line L—L so that information can be shifted upward to cores above line L—L, such shifting being in parallel. Such means for transferring information upwardly are not shown, but it is to be understood that such retransfer of information back to the cores above the line L—L is within the scope of the present invention. In effect, just as one obtains reversible shifting, such as shift-left or shift-right, by employing low impedance paths for one group of capacitors and not for another group of capacitors, one may also obtain shift-up or shift-down transfer by selecting different impedance paths for the capacitors being charged when cores are being switched.

A novel and improved reversible shift register employing bistable magnetic elements has been described above which affords rapid, reliable, and simple shifting of information, yet requires relatively few windings about the bistable storage elements utilized in such shift register.

What is claimed is:

1. A reversible shift register comprising a plurality of bistable magnetic cores, each core having two stable states of magnetic remanence to represent the storage of binary information, a pair of transfer loops associated with a selected bistable core wherein the first transfer loop of said pair couples said selected bistable core with a core immediately to its right in said shift register and the second transfer loop couples said selected core with a core immediately to its left in said shift register, means for sensing the magnetic remanent state of said selected core so as to tend to create transfer current flow through both transfer loops when said selected core is switched from a preselected stable state to its other stable state, a capacitor in each transfer loop and adapted to store such transfer currents as electrical charges thereon, and means for supplying during the sensing of said selected core a low impedance path for one capacitor in shunt with its respective transfer loop and a high impedance path for said other capacitor in shunt with its respective transfer loop, whereby the transfer of binary information from the selected core is made to a core on its right or left depending upon which capacitor has the high impedance shunt path.

2. A reversible one core per bit shift register comprising a plurality of bistable magnetic cores, each core having two stable states of magnetic remanence to represent the storage of binary information, a pair of transfer loops associated with a selected bistable core wherein the first transfer loop of said pair couples said selected core with a core immediately to its right in said shift register and the second transfer loop couples said selected core with a core immediately to its left in said shift register, means for sensing the magnetic remanent state of said selected core so as to tend to create transfer current flow through both transfer loops when said selected core is switched from a preselected stable state toward its other stable state, such transfer current tending to apply switching energy to both cores coupled to the selected core, a capacitor in each transfer loop and adaped to store such transfer currents as electrical charges thereon, means for supplying during the sensing of said selected core a low impedance path for one capacitor in shunt with its respective transfer loop and a high impedance path for said other capacitor in shunt with its respective transfer loop, and inhibiting means for preventing discharge of said capacitor having the high impedance shunt path until said sensing means is withdrawn.

3. A reversible shift register comprising a plurality of bistable magnetic elements, each element having two states of magnetic remanence to represent the storage of binary information, a pair of transfer loops associated with a selected bistable element, a first transfer loop comprising a first output winding on said selected element, a first unidirectional impedance element and an input winding coupled to a bistable magnetic element adjacent to and to the right of said selected element, a second transfer loop comprising a second output winding on said selected element, a second unidirectional impedance element and an input winding on a bistable magnetic element adjacent to and to the left of said selected element, a capacitor included in each transfer loop, means for sensing the magnetic remanent state of said selected element so as to produce an electrical potential across each output winding when said selected element is switched from a preselected stable state toward its other stable state, said potential serving to charge each capacitor in each transfer loop, and means for supplying a low impedance shunt discharge path for one capacitor and a high impedance shunt discharge path for the other capacitor during such switching of said selected element so as to determine which one of said transfer loops will be effective in transferring the binary information stored in said selected element.

4. A one core per bit reversible shift register comprising a plurality of bistable magnetic cores, a sensing winding, an input winding, and two output windings on each of said cores, said sensing windings being connected to receive actuating electrical pulses which cause said cores to switch toward a predetermined stable state, a first temporary storage circuit and a first unidirectional impedance element coupling an output winding of a selected core to the input winding of a core immediately adjacent to and to the right of said selected core, a second temporary storage circuit and a second unidirectional impedance element coupling the second output winding of said selected core to the input winding of a core immediately adjacent to and to the left of said selected core, said temporary storage circuits serving to store as an electrical charge the magnetic flux induced in said output windings when said selected core is being switched toward said predetermined stable state by said actuating electrical pulses, means for providing, during such switching of said selected core, a low impedance shunt discharge path for one of said storage circuits so as to bypass its associated input winding and a high impedance shunt path for said other storage circuit whereby the latter's discharge path includes its associated input winding.

5. A reversible one core per bit shift register comprising a plurality of bistable magnetic cores, each core having two stable states of magnetic remanence to represent the storage of binary information, a pair of transfer loops associated with a selected bistable core wherein the first transfer loop of said pair couples said selected core with a core immediately to its right in said shift register and the second transfer loop couples said selected core with a core immediately to its left in said shift register, means for sensing the magnetic remanent state of said selected core so as to tend to create transfer current flow through both transfer loops when said selected core is switched from a preselected stable state towards its other stable state, a normally disabled regenerative switching circuit lying in each transfer loop and providing, when operating, switching energy to its associated core, a capacitor in each transfer loop and adapted to store such transfer currents as electrical charges thereon, means for supplying during the sensing of said selected core a low impedance path for one capacitor in shunt with its associated transfer loop and a high impedance path for said other capacitor in shunt with its associated transfer loop, and inhibiting means for preventing discharge of said capacitor having the high impedance shunt path until said sensing means is withdrawn, whereby when said sensing means and inhibiting means are withdrawn said capacitor having the high impedance shunt path discharges to trigger said normally disabled regenerative switching circuit into operation to supply switching energy to its associated core.

6. A reversible shift register comprising a plurality of bistable cores, each core having two stable states of magnetic remanence to represent the storage of binary information, a pair of transfer loops associated with a selected bistable core wherein the first transfer loop of said pair couples said selected core with a core immediately to its right in said shift register and the second transfer loop couples said selected core with a core immediately to its left in said shift register, means for sensing the magnetic remanent state of said selected core so as to create transfer current flow through both transfer loops when said selected core is switched from a preselected stable state towards its other stable state, a normally disabled regenerative switching circuit lying in each transfer loop and including a trigger winding, a switching winding, and a transistor having an emitter electrode, a base electrode, and a collector electrode, said trigger winding being connected to said base and said switching winding being connected to said collector, a source of electrical energy applied to said transistor between said emitter electrode and said collector electrode, means for applying a biasing potential to said emitter electrode so as to render said transistor non-conducting, a capacitor in each transfer loop and adapted to store such transfer currents as electrical charges thereon, and means for supplying during the sensing of said selected core a low impedance path for one capacitor in shunt with its associated transfer loop and another path for said other capacitor through such trigger winding.

7. Apparatus as claimed in claim 2 characterized in that each of said first and second transfer loops includes an individual output winding magnetically coupled to said selected core, and further characterized in that said capacitor in each of said transfer loops is coupled across the individual output winding of its respective transfer loop.

8. Apparatus as claimed in claim 5 characterized in that each of said first and second transfer loops includes an individual output winding magnetically coupled to said selected core and further characterized in that said capacitor in each of said transfer loops is coupled across the individual output winding of its respective transfer loop.

References Cited in the file of this patent

UNITED STATES PATENTS

| | | |
|---|---|---|
| 2,785,390 | Rajchman | Mar. 12, 1957 |
| 2,803,812 | Rajchman | Aug. 20, 1957 |